United States Patent Office 3,580,950
Patented May 25, 1971

3,580,950
CHELATING COMPOSITIONS BASED ON
CHELATING ACIDS AND AMINES
Frederick C. Bersworth, 120 Washington St.,
East Orange, N.J. 07017
Continuation-in-part of applications Ser. No. 580,829,
Sept. 20, 1966, now Patent No. 3,351,758, and Ser. No.
588,224, Oct. 20, 1966, now abandoned, and a continuation of application Ser. No. 468,182, June 4, 1965,
now abandoned, which is a continuation of applications
Ser. No. 446,120, Apr. 6, 1965, and Ser. No. 466,090,
June 24, 1965, now abandoned, which in turn is a continuation-in-part of applications Ser. No. 88,604,
Feb. 13, 1961, now abandoned, and Ser. No. 88,606,
Feb. 13, 1961, now abandoned. This application Nov. 1,
1967, Ser. No. 679,626
Int. Cl. C07c 101/26
U.S. Cl. 260—534       5 Claims

ABSTRACT OF THE DISCLOSURE

Chelating acids based on the synthetic polyamino polycarboxylic acids are reacted with amino compounds, such as ethylene diamine, ethanolamine, hexamethylene diamine, and polyamines of such linear structure to form reaction products carrying amino structures in relation to the synthetic amino acid starting material, such that effective chelators for iron and other transition metals are formed.

RELATED APPLICATION

This application is a continuation-in-part of my application Ser. No. 580,829, filed Sept. 20, 1966, issued U.S. Pat. 3,351,658, Nov. 7, 1967, and Ser. No. 588,224, now abandoned, a continuation of Ser. No. 468,182, in turn continuations of Ser. No. 446,120, filed Apr. 6, 1965, and Ser. No. 466,090, filed June 22, 1965, now abandoned, which applications in turn, are continuations-in-part of prior filed applications. Ser. Nos. 88,604 and 88,606, filed Feb. 13, 1961, now abandoned, all said precursor applications being fully incorporated herein, under 35 USC 120.

BACKGROUND OF THE INVENTION

The usefulness of chelating compounds as a class is well established. The compounds are water soluble and provide means to soften water, for treating solutions, and, generally, chemically react with heavy metal ions in purification operations, metal recovery operations, equipment cleaning operations, laundry, and particularly, in agricultural activity to put trace metals into soil in soluble form, or to add the chelating agents to soil, as such, thereby solubilizing trace metals present in the soils as oxides. In other words, wherever a chemical or natural phenomenon occurs the chelation reaction of the chelating moiety can find its use.

An object of the present invention is to provide chelating moieties using hydrogen-nitrogen compounds which can be considered fertilizing agents, or fertilizer precursors, which, upon decomposition in soil will give ammonia.

It is another object of the invention to provide agents of solubility and substantivity toward iron, such that they will find great usefulness in washing and detergent operations.

Furthermore, the instant compositions are directed to providing modifications of the moieties such that the material can be used as surface active agents, which include the chelating function along with the surface activity through the attachment of a long chain group directly to nitrogen, together with hydrophylic compositions, so that surfactant and chelating functions can be present together in the same solution, if not actually in the same molecule.

Other objects and advantages of the invention will in part be obvious and in part appear hereinafter.

DETAILED DESCRIPTION OF THE INVENTION

The invention accordingly, comprises novel compositions formed as the reaction product of a chelating acid corresponding to a formula given by the following:

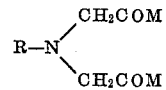

wherein R is hydrogen, or

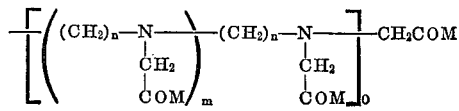

$m = 0-4$
$o = 0, 1$
$n = 2, 3$ and COM is independently selected from the group consisting of —COOH, —COONa, —CCOK, —COONH$_4$ and —COO-alkyl, not more than two COM's being —CH$_2$OH so that the starting acid compound has at least one moiety which can be available for reaction with the amine.

Representative compounds coming within this class are imino diacetic acid, diglycine, 2 hydroxyethyl nitrilo diacetic acid, nitrilo triacetic acid, ethylenediaminetetraacetic acid, diethylenetriaminepentaacetic acid, and the hydroxyethyl variants of these acid compounds having over two acetic acid moieties, wherein one or two of the acetic acid groups are replaced by a hydroxyethyl group (or hydroxypropyl group). It is understood that the propionic acid analogues are also useful. Typical Acid Reaction Components useful for preparing these compositions and, in fact, preferred for preparing these compositions are: imino diacetic acid, nitrilo triacetic acid, ethylenediaminetetraacetic acid. These reaction components are generally preferred for use in an acid form which is to say, an acid salt form. Generally, they are used in this form because this is the more water soluble form of the compound; that is, the ethylenediaminetetraacetic acid in the mono di- and tri-salt forms are the most common; the tetra acid form is relatively insoluble in water and not conveniently used in aqueous chemical reactions, although for my purposes, in the present situation, it can be used, particularly in a fusion. The tetra salt form is not specifically a very useful form, because it is a salt and provision must be made for its conversion to acid form in order to provide for elimination of water of reaction when the acid material is reacted with the amine.

The hydroxyethyl variants of the ethylenediaminetetraacetic acid are also valuable. Similarly, the hydroxyethyl variants of the nitrilotriacetic acid are useful. These are compounds within which a hydroxyethyl group replaces one or two or the acid groups in the acid form of the compound, but leaves at least two acid moieties in good chelating relationship, thus

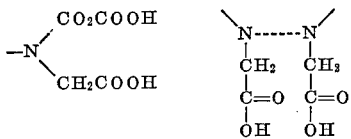

The said chelating acid being reacted with an amine or polyamine answering to a formula as follows:

$$R—NH_2$$

wherein R represents an alkyl or hydroxyethyl group of 1–18 carbon atoms, and polyamines answering the formula $$NH_2—(CH_2)_n—[NH—(CH_2)_n]_x—NH_2$$

wherein $n$ is an integer of value 2, 3, 4 . . . 18,
$x$ is an integer of value 0, 1, 2, 3, 4, 5, etc.

Typical amines useful for the reaction are ethylene diamine, ethanolamine, hexamethylene diamine and polyamines. These amines are known compounds, all of which answer generally to the following generalized formulas:

$$H_2N—CH_2CH_2NH_2$$

$$H_2N(CH_2)_nNH_2$$

$$H_2N—R—(NH—R)—NH_2$$

wherein $n$ is a small whole number, and wherein R is an alkyl group of 2, 3, or 4 carbon atoms, i.e., ethylene, propylene, isopropylene, tetramethylene. The reaction thus is carried out between the labile hydrogen of the amine, generally the terminal hydrogen and the hydrogen of the acid form of the synthetic polyaminopolycarboxylic acid, to give a chelating structure which is pictured as follows:

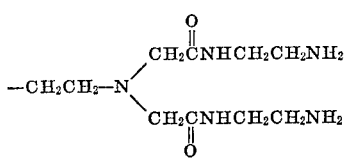

When the amine reacts with two appropriately oriented acid groups, alternatively, it can be stated

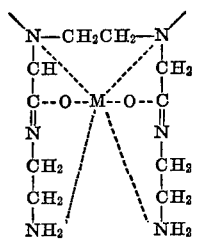

M being any polyvalent metal.
It is to be noted that the reaction develops a $$—CONH—$$

moiety as a source of chelation activity. This is a very useful ligand and its orientation with respect to the amine acid nitrogen is favorable to the development of chelation capacity for transition and heavy metals. The terminal $NH_2$ group is available for further reaction.

It can be observed immediately from the postulated formulas for the compounds that they are characterized by the fundamental chelating acid nucleus, carrying the polyamino complex basic structure on the acetic acid group, thereby giving a complex material having many ligands supplying many points of attachment to metal ions in solution, so that a fully coordinatively saturated ion can be formed whenever it reacts with this form of structure. The chemical reaction which reasonably postulates the mechanism for the formation of the compound may be stated as follows:

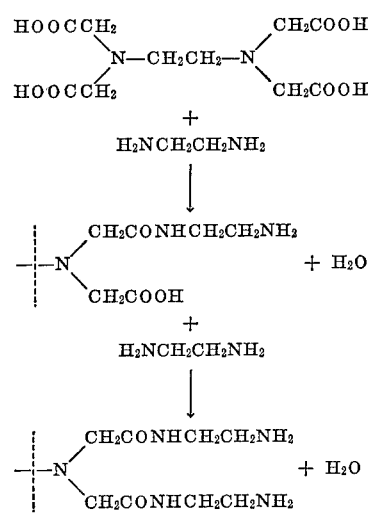

etc.

The preferred kind of compound in which to form the —CONHR ligand structure characteristic of these reaction products is a polyamine, for example, an ethylene diamine or propylene diamine or isopropylene diamine, the chain being as long as the operator may wish, but generally, no particular advantage being derived by having more than about three or four carbon atoms between the nitrogens, the length of chain thus contributing to the chelating functions without interference with the formation of chelate compound. The details of the reaction are relatively simple. In general, reaction between a carboxylic acid moiety and an amine moiety is induced with separation of water of reaction to form a —CONH— group, whereupon the reaction product is isolated as a solid, crystalline, semicrystalline, or amorphous material, depending upon the nature of the reactants. Separation of water can be by direct heating, evaporation, or azeotropic distillation.

The following examples will illustrate the formation of the compounds:

EXAMPLE I

EDTA+Ethylamine (EDTA=ethylene diamine tetraacetic acid)

EDTA—60 grams (⅕ mole)
Ethylamine 33%—200 milliliters
$H_2O$—200 milliliters

Reflux for 1 hour, then use vacuum, and concentrate to low volume. 93 grams of slightly yellow resin tends to crystallize in star form; almost solid after standing for 2 days.

$Fe^{3+}$ chelate at ambient pH 5—red
$Fe^{3+}$ chelate at ambient pH of 10—cherry red Stable to storage and on boiling.

EXAMPLE II $Na_2EDTA$ and ethylene diamine $Na_2EDTA$—38 grams (⅒ mole) (Baker)
Water—100 grams
(99%)—10 grams Heat to reflux with agitation; solution is clear.

Now apply house vacuum (water aspiration), and concentrate to 50 grams of viscous resin. The product is quite yellow is soluble in water and methanol. Ambient pH is 8.

$Fe^{3+}$ chelate is reddish yellow at this pH and deep red at pH 11. It is stable to boiling, and on storage. The syrup obtained in the first reaction will take more EDTA (10 grams syrup+5 grams EDTA); gives semi-solid resin; water soluble. The $Fe^3$ chelate is yellow at ambient pH of 7, and red at pH of 9.

EXAMPLE III

NTA and hexamethylene tetramine (NTA=nitrilo triacetic acid)

NTA—20 grams (1/10 mole)
Hexamethylene tetramine—14 grams
Distilled water—150 milliliters In open beaker, heat and agitate.

There is no solution at first, but within 1 hour a clear solution is obtained. $CH_2O$ comes off; let stand. Crystals form on cooling.

The $Fe^3$ chelate is red at pH 7.
The $Fe^3$ chelate is deep red at pH 10.

EXAMPLE IV

As above, but using hexamethylene diamine (Du Pont)

$Na_2EDTA$—38 grams (1/10 mole) (Baker)
Water—100 milliliters
Hexamethylene diamine molar excess Product is a resin. The $Fe^3$ chelate is very stable; it is a deep red at pH 12; and foams.

EXAMPLE V

Using a mono amine+NTA

NTA—50 grams (1/4 mole)
Excess ethyl amine 33 1/3 % solution—150 milliliters
Water—100 milliliters Reflux, agitate, and react for 1 hour, clear solution.

Now apply vacuum and remove excess ethyl amine and water down to a quite crystalline mass weighing 94 grams. Take sample: A test of this crude reaction product shows $Fe^{3+}$ chelate: yellow at ambient pH; golden yellow at pH of 10.

Stable to storage and to boil.

EXAMPLE VI

Using a mono amine+NTA

NTA—50 grams (1/4 mole)
Excess ethyl amine 33 1/3 % solution—150 milliliters
Water—100 milliliters Reflux, agitate, and react for 1 hour, clear solution.

Now apply vacuum and remove excess ethyl amine and water down to a quite crystalline mass weighing 94 grams. Take sample: A test of this crude reaction product shows $Fe^{3+}$ chelate: yellow at ambient pH; golden at pH of 10.

Stable to storage and to boil.

Purification of crude product:

In general, the preparation follows the scheme of the examples. Thus, approximately one equivalent of amine per acid moiety of the reaction acid is used. That is, at least 1 —CONH— group should be developed in the compound. Preferably, two such moieties are developed, and this is accomplished by employing an appropriate amount of the amine, generally a slight excess over the required two equivalents of the amine to obtain the disubstituted composition.

The following tabulation summarizes the reaction of amines and polyamines with carboxymethylamino acids:

| Examples | Reagent | Reaction conditions | |
|---|---|---|---|
| I | NTA, 50 grams; ethylene diamine, 33% solution excess, 100 ml.; water, 50 ml. | Reflux with agitation for 1 hr.; invert condenser and apply vacuum. | Fe nitrate 70 grams, yellow and red, air dries to solid 67 grams. |
| II | EDTA, 60 grams; ethylene diamine solution excess, 120 ml.; water, 100 ml. | do | Greenish yellow resin air dries to semi-solid weight to 70 grams. |
| III | NTA, 50 grams; ethylene diamine, 90%, 20 cc.; water, 150 cc. | do | 60 grams viscous resin, yellowish color, pH 7. |
| IV | EDTA, 60 grams; ethylene diamine, 90% solution, 30 cc.; water 150 cc. | do | 70 grams viscous yellow resin, soluble water and alcohol, pH 8. |
| V | $Na_2EDTA$, 35 grams; propylene diamine, 70% solution, 30 cc.; water 100 cc. | do | 45 grams viscous yellow resin, soluble water and alcohol. |
| VI | $Na_2EDTA$, 38 grams; hexamethylene diamine, 30 grams; water, 150 cc. | Product foams in water, chelate form. | 48 grams of light yellow resin, viscous solution in water, methanol. |

The sequestration values of the materials prepared in accordance with this invention show most promise in their reactions in the chelation of iron. Thus, using, the reaction products obtained by reacting the diamino acids with amines and polyamines, in accordance with the examples, the products show good chelating properties.

On the tabulation of composition the right hand column shows *Resin*.

These Resin-like products may be heated to drive off all volatile materials such as water of hydration and residual amines to form dry white products. The heating may be accomplished by baking in an open dish, under vacuum, or by azeotropic distillation.

The dry compositions so obtained are excellent chelating agents for the transition metal ions particularly iron ions and on an overall basis of 1 gram of dry composition to 0.5 gram of $Fe(NO_3)_3 \cdot 9H_2O$. All are stable to long storage at pH 11+ and to boiling temperatures in aqueous solution.

Generally, any of the products of reaction produced by the examples are the reaction of the polyamine with polycarboxylic acid. It is so effective in the chelation of iron that textiles—cotton cloth, stained with iron—can be washed free of iron using the complex formed in accordance with this invention. Thus, the utility of the material in laundering applications is virtually self-evident.

In recapitulation, it will be observed that the valuable structure made up of the —$CH_2CONHR$ group is a novel chelating moiety useful for the chelation of iron. Generally any material which will chelate iron is usually quite effective with other metals. I have found that this structure, when formed by a condensation with ethylenediaminetetraacetic acid and its homologues, and polyamine derivatives, will be formed and gives valuable chelation materials and metal ion stabilizers as a class. The amino carbon residue which remains beyond the —CONHR— group, is not important, in that such common residues may be: amino groups or hydrocarbons, such as ethyl, propyl, etc. The amines may be polyamines, such as ethylenediamine, propylene, diamine, or hexamethylene diamine. Thus the complexing moiety which appears important in this kind of system is

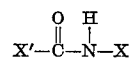

wherein X' for effective chelation must contain a chelating (complexing) atom either in the β (5 membered ring formed) or γ (6 membered ring formed) position relative to the carbonyl. Typical examples —$CH_2NH_2$ (N is β), —$CH_2CH_2NH_2$ (N is γ), $CH_2OH$, $CH_2SH$. X' can also be polyfunctional, i.e. contains many complexing atoms but for most effective chelation the 5 and 6 numbered rings must be preserved.

The second group X must again be an atom capable of complexing but it should be capable of withdrawing electron density from the nitrogen to enhance the shift of the hydrogen to the oxygen. This will give the enol form

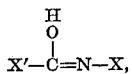

which is most likely the species which forms the stable complexes. When X is a group that does not aid in these internal processes, i.e. H, $CH_3$, complexing is nil.

Although the invention has been described in connection with various specific embodiments, it is to be understood that it includes all modifications and variations that come within the scope of the appended claims.

What is claimed is:

1. The reaction product of an amine selected from the group consisting of those having the formula

wherein $n$ is an integer of value 2–18, $x$ is an integer of value 0, 1, 2, 3, 4, 5, or hexamethylene tetraamine, and an amino polycarboxylic acid corresponding to the following formula

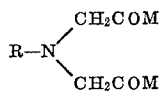

wherein R is selected from the group consisting of hydrogen and

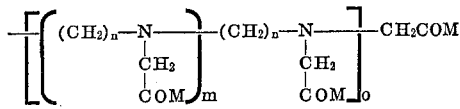

in which $m = 0-4$
$o = 0, 1$
$n = 2, 3$ and COM is independently selected from the group consisting of —COOH, —COONa, —COOK, —$COONH_4$, —$CH_2OH$ and —COO-alkyl, not more than two COM's being —$CH_2OH$ and the starting acid compound has at least two moieties available for reaction with the amine compound and reacting said amine and acid to form an amide linkage with at least one —COM group.

2. The reaction product, in accordance with claim 1, formed by reaction between ethylenediaminetetraacetic compound and ethylene diamine in the proportion of about 2 mols of ethylene diamine per mol of ethylenediamnie traacetic acid.

3. The reaction product, in accordance with claim 1, formed by the reaction of nitrolotriacetic acid with hexamethylene tetramine in the ratio of one mole of hexamethylene tetramine per mol of nitrilotriacetic acid.

4. The product of reaction, in accordance with claim 1, between ethylenediaminetetraacetic acid compound and hexamethylene diamine, wherein the amount of hexamethylene diamine is in molar excess of the amount of starting acid.

5. The product of reaction, in accordance with claim 1, between nitrilotriacetic acid and ethylene diamine the amount of ethylene diamine is in the range from one mol to five mols per mol of starting acid.

References Cited

UNITED STATES PATENTS

| | | | |
|---|---|---|---|
| 3,024,277 | 3/1962 | Hotten | 260—534E |
| 2,954,342 | 9/1960 | Hotten | 252—40.7 |

CHARLES B. PARKER, Primary Examiner

J. L. DAVISON, Assistant Examiner

U.S. Cl. X.R.

260—561, 482